(Model.)
P. B. HIRSCH.
SADDLE SEAT.
No. 297,398. Patented Apr. 22, 1884.
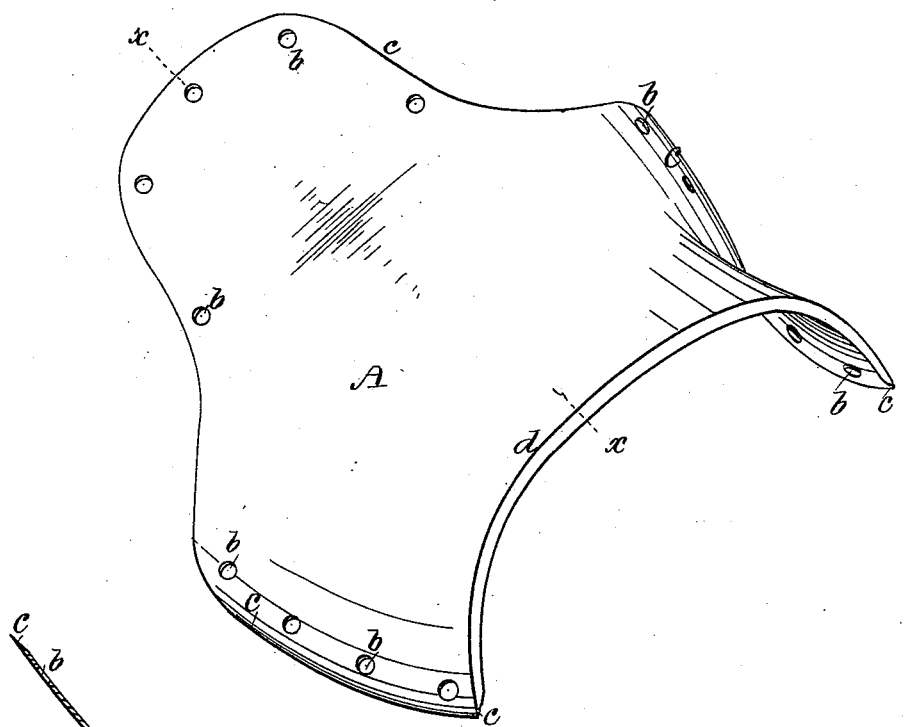
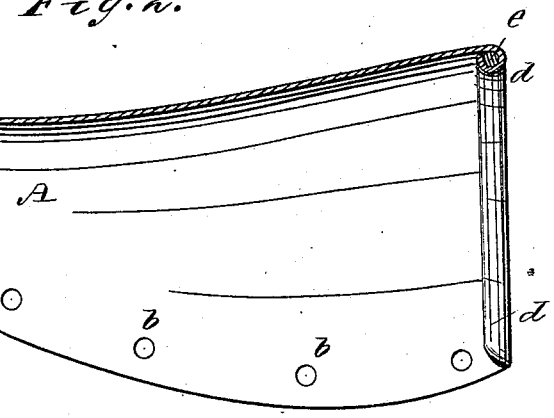
WITNESSES:
Theo. G. Hoster
C. Sedgwick
INVENTOR:
P. B. Hirsch
BY Munn & Co.
ATTORNEYS.

UNITED STATES PATENT OFFICE.

PETER B. HIRSCH, OF DENVER, COLORADO, ASSIGNOR OF ONE-HALF TO THOMAS FLYNN, OF SAME PLACE.

SADDLE-SEAT.

SPECIFICATION forming part of Letters Patent No. 297,398, dated April 22, 1884.

Application filed December 22, 1882. (Model.)

*To all whom it may concern:*

Be it known that I, PETER B. HIRSCH, of Denver, Arapahoe county, in the State of Colorado, have invented an Improvement in Saddles, of which the following is a specification.

The invention relates to "building up" on the saddle-tree a seat for receiving the human buttocks, which constitute the vertical bearing part of a rider, and sustaining them without discomfort. This has hitherto been done by bridging the usual slot in the tree with a curved plate not conformed to the shape of the buttocks, and then "building" upon this layers of leather shaped to give the desired form to the seat.

My invention consists in dispensing with the bridge-plate and the layers of leather, and employing in lieu thereof a single plate of metal shaped in dies to produce the exact form required.

Figure 1 of the drawings is a perspective view of my invention. Fig. 2 is a longitudinal section on line *x x* of Fig. 1.

In the drawings, A represents my improved saddle-seat, shaped to form a comfortable seat for a rider's buttocks; *b*, holes through which the seat may be tacked or screwed to the tree; *c*, the edge chamfered to come as nearly as possible flush with the surface of the tree; and *d*, the front edge of seat, turned over a stiffening-wire, *e*, to keep the plate in shape.

For several years I have been forming the seat of a bridge-plate (as shown in Patent No. 209,415) and superposed layers of leather, the latter cut and shaped by skilled workmen; but, after much thought and experiment, I find that I can dispense with the leather layers and the cost of skilled labor in working them up by my invention.

What I claim as new is—

A sheet-metal saddle-seat shaped to the form of a rider's buttocks, and turned at the front over a stiffening-wire to retain the plate in shape, as described.

PETER B. HIRSCH.

Witnesses:
S. VINSON FARNUM,
GEO. S. VAN LAW.